US005797089A

United States Patent [19]

Nguyen

[11] Patent Number: 5,797,089
[45] Date of Patent: Aug. 18, 1998

[54] PERSONAL COMMUNICATIONS TERMINAL HAVING SWITCHES WHICH INDEPENDENTLY ENERGIZE A MOBILE TELEPHONE AND A PERSONAL DIGITAL ASSISTANT

[75] Inventor: Nam D. Nguyen, Quebec, Canada

[73] Assignee: Telefonaktiebolaget LM Ericsson (publ), Stockholm, Sweden

[21] Appl. No.: 524,867

[22] Filed: Sep. 7, 1995

[51] Int. Cl.⁶ .................................................. H04M 11/00
[52] U.S. Cl. ........................ 455/403; 455/556; 455/557; 455/553
[58] Field of Search ................... 379/58, 59, 96, 379/98, 100; 455/33.1, 403, 556, 557, 553, 566, 572, 575

[56] References Cited

U.S. PATENT DOCUMENTS

| 4,972,457 | 11/1990 | O'Sullivan | 379/59 |
| 5,475,866 | 12/1995 | Ruthenberg | 455/33.1 |
| 5,479,479 | 12/1995 | Braitberg et al. | 379/59 |
| 5,522,089 | 5/1996 | Kikinis et al. | 379/96 |
| 5,572,573 | 11/1996 | Sylvan et al. | 379/58 |
| 5,581,261 | 12/1996 | Hickman et al. | 455/33.1 |
| 5,584,054 | 12/1996 | Tyneski et al. | 379/58 |

FOREIGN PATENT DOCUMENTS

| 0 472 361 A2 | 8/1991 | European Pat. Off. |
| 0 651 544 A2 | 10/1994 | European Pat. Off. |
| WO 90/03076 | 3/1990 | WIPO |
| WO 96/38970 | 12/1996 | WIPO |

OTHER PUBLICATIONS

Yvonne L. Lee; "Is it a phone or a PDA? Here's what Simon says"; *Infoworld* Magazine; Sep. 26, 1994; p. 124.

Steve Mann; "Searching for the Perfect PDA"; *Wireless For the Corporate User* Magazine; vol. 3, No. 6, 1994.

Andy Reis . . .; "EO's Personal Communicator Ushers in a New Era"; BYTE Magazine; Mar. 1993, p. 52.

ARDIS advertisement; ARDIS Company; 1994.

Smith Corona HandiFax catalog listing; 1994.

Steven B. Weisman; "PDAs Today: Technology Trends and Market Dynamics"; BIS Strategic Decisions; Dec. 1992.

"Mitsubishi handheld combines cellular phone, electronic organizer"; *PC Week* Magazine; Nov. 7, 1994; p. 57.

*Primary Examiner*—William Cumming
*Assistant Examiner*—Keith Ferguson
*Attorney, Agent, or Firm*—Smith & Catlett, P.C.

[57] ABSTRACT

A personal communications terminal (PCT) in a case having a first half hingedly connected to a second half. The PCT operates in an open and a closed position and comprises a mobile telephone unit and a personal digital assistant (PDA) unit electronically connected to the mobile telephone unit. The PDA unit is a fully functional personal computer. The PDA unit comprises a memory for application software programs, a memory for data, a processor for performing operations with the data and the application programs, a modem for passing data between the PDA unit and the mobile telephone unit, and a mobile data interface for passing data between the PDA unit and the mobile telephone unit without utilizing the modem. When the PCT is in the open position, it forms two interior faces which include a PDA display screen on one face and a full alpha-numeric keyboard on the other face. The PCT may be operated as a standard wireless telephone, as a personal computer, or in an integrated mode for FAX, wireless data transfer, or sending and receiving short message service (SMS) messages.

22 Claims, 4 Drawing Sheets

PERSONAL COMMUNICATIONS TERMINAL HAVING SWITCHES WHICH INDEPENDENTLY ENERGIZE A MOBILE TELEPHONE AND A PERSONAL DIGITAL ASSISTANT

BACKGROUND OF THE INVENTION

1. Technical Field of the Invention

This invention relates to mobile stations in a radio telecommunications network and, more particularly, to an integrated personal communications terminal which performs the functions of a mobile telephone while transmitting, receiving, and displaying text or images.

2. Description of Related Art

In modem radio telecommunication systems, subscribers move throughout the coverage area of the system utilizing mobile telephones referred to as mobile stations. Existing mobile telephones have a small display, such as a LED display, for displaying to the subscriber the telephone number being called and the status of the call.

Subscriber demand is great for mobile stations with increased communications capabilities. For example, subscribers desire mobile stations capable of transmitting, receiving, and displaying text and images. Heretofore, there has not been a self-contained mobile station capable of operating as a mobile telephone while performing these more advanced functions in a convenient manner. An existing solution has been to use a portable computer such as a laptop or Notepad, such as the Newton Notepad from Apple Computer, which is connected to a mobile telephone so that text and images can be displayed.

There are several problems, however, with this existing solution. First, the subscriber must carry around the laptop or Notepad computer in addition to the subscriber's mobile telephone. This is inconvenient at best, and for some subscribers, or in some circumstances, it is not possible. Second, the subscriber must possess the knowledge required to connect the portable computer to the mobile telephone. With the use of mobile telephones expanding rapidly within the general population, there are many subscribers who do not possess this knowledge. Third, the subscriber must take time to connect the portable computer to the mobile telephone. Again, this is inconvenient at best, and may result in increased cost to the subscriber since a call is either lengthened by the time it takes the subscriber to connect the computer and the telephone, or two calls must be placed: a first call to alert the subscriber that text or images are to be sent, and a second call to send the text or images.

Although there are no known prior art teachings of a solution to the aforementioned deficiency and shortcoming such as that disclosed herein, a number of prior art references exist that discuss subject matter that bears some relation to matters discussed herein. Such prior art references are U.S. Pat. No. 5,348,347 to Shink, a publication titled "Searching for the Perfect PDA", and a publication titled "Is it a phone or a PDA? Here's what Simon says". Each of these references is discussed briefly below.

U.S. Pat. No. 5,348,347 to Shink discloses a pocketbook size organizer that can store a portable cellular telephone. The organizer comprises a flexible book that may hold a mobile telephone, a notepad, a pen, a calculator, and a timer. However, Shink does not teach or suggest a personal communications terminal which can perform as a mobile telephone while transmitting, receiving, and displaying text or image data.

The publication titled "Searching for the Perfect PDA" describes three generations of personal digital assistants (PDAs). The first generation comprised palmtop or handheld computers. These palmtops were generally pocket sized with a split case and a hinge on the spine. One side of the palmtop held a display, and the other side held a keyboard. External communication was limited to a serial port for connecting to a desktop computer or external modems. The second generation of PDAs was much like the first generation, but added the capability to recognize handwriting entered with a stylus on the display screen. The third generation of PDAs are often called Personal Communications Assistants (PCAs) or Personal Intelligent Communicators (PICs). The most advanced PCA appears to be a device sold by BellSouth Cellular Corporation called Simon.

The publication titled, "Is it a phone or a PDA? Here's what Simon says" is a journal article appearing in the Oct. 31, 1994 issue of InfoWorld magazine at pages 119–120. The article describes the Simon as a device comprising a cellular telephone and a personal digital assistant (PDA). The device may function as a mobile telephone as well as offering communications features such as electronic mail (E-mail) and faxing. The Simon device is not a fully functional personal computer. It is a cellular phone that is also programmed with personal information management (PIM) software applications such as a notepad, address book, calendar, calculator, and the like.

Almost all of one side of the Simon device is a LCD display, but this configuration has several disadvantages. First, since the display covers the entire side of the device, the Simon device must use an on-screen keyboard. When used as a PDA rather than a telephone, the device may display one of two on-screen keyboards or a numeric keypad for use with a calculator application. This creates a second disadvantage, however, since the small size of the on-screen keyboard requires that a stylus be used to make data entries. The on-screen keyboard is not designed for touch typing, but a modest amount of data entry is possible. The on-screen keyboard also creates a third disadvantage because a very limited amount of display area remains for displaying text or graphics information when the keyboard is displayed. While acceptable for straight data entry, this solution is not suitable for interactive programs or programming.

An additional disadvantage of the Simon device is its exposed display screen which covers virtually all of one side of the device and is therefore extremely vulnerable to impact damage. Great care must be taken when utilizing the Simon device, and this is not always practical when when utilizing a mobile station.

It would be a distinct advantage to have a personal communications terminal that overcomes the above-mentioned disadvantages. Such a terminal would have the full capabilities of a personal computer, a keyboard large enough for manual data entry without the use of a stylus, and a display screen with enough usable area for interactive programming. In addition, the display screen would be mounted in a protected location allowing full use of the terminal in a rugged mobile environment.

Review of each of the foregoing references reveals no disclosure or suggestion of a system or method such as that described and claimed herein.

SUMMARY OF THE INVENTION

In one aspect, the present invention is a personal communications terminal (PCT) in a case having a first half hingedly connected to a second half The PCT may operate in an open and a closed position and comprises a mobile telephone unit and a personal digital assistant unit electronically connected to the mobile telephone unit. The personal digital assistant unit comprises a first memory device for storing a first set of application software programs, a second memory device for storing a first set of data, and a processor for performing operations with the first set of data utilizing the first set of application software programs. The PCT also includes a power supply for providing electrical power to the mobile telephone unit and the personal digital assistant unit, a modem for passing data between the personal digital assistant unit and the mobile telephone unit, and a mobile data interface for passing data between the personal digital assistant unit and the mobile telephone unit without utilizing the modem.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
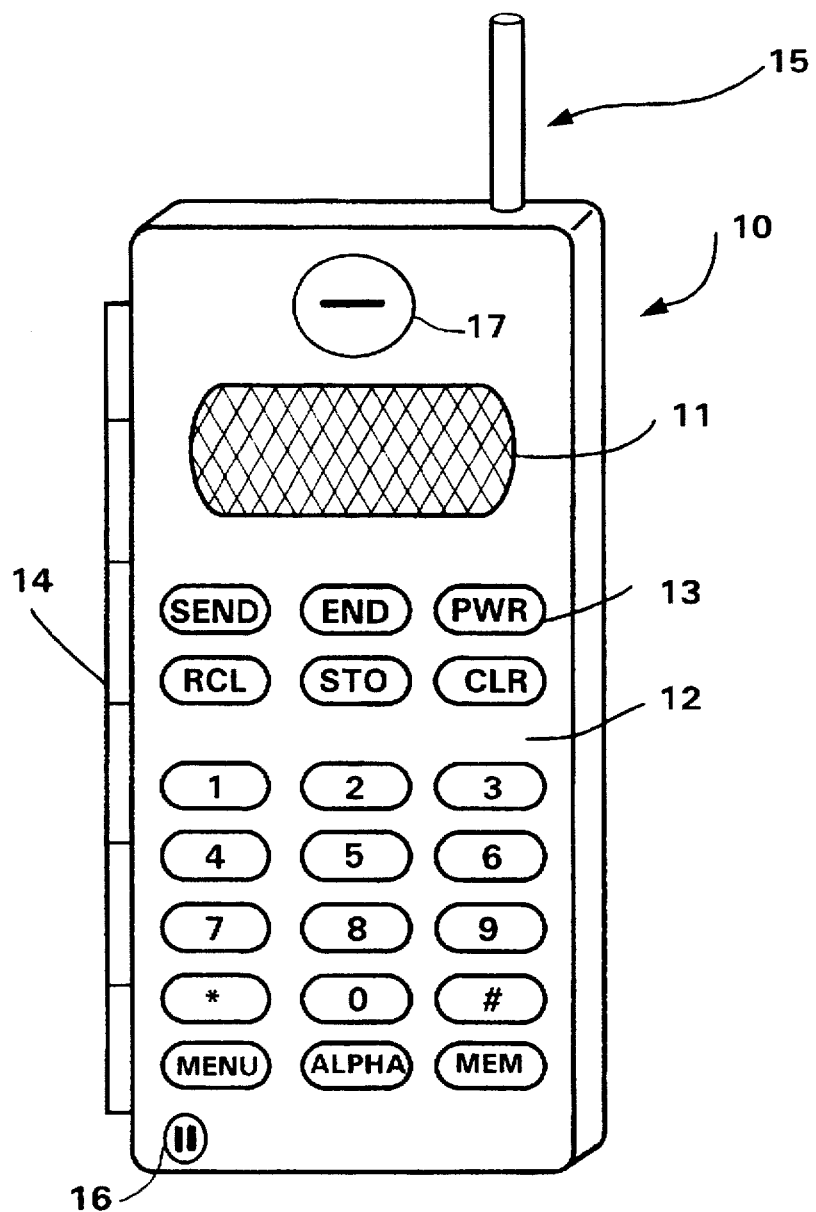
FIG. 1 is a front side elevational view of the personal communications terminal (PCT) of the present invention in a closed position.

FIG. 1 is a front side elevational view of the personal communications terminal (PCT) 10 of the present invention with its case in a closed position. The front side may include a standard radio telephone display 11 and keypad 12. A telephone power switch 13 is located on an exterior side of the PCT 10 and is utilized to independently power ON or OFF a mobile telephone unit within the PCT 10 when the PCT is in the closed position. When the telephone unit is powered ON, and the PCT is in the closed position, the telephone display 11 displays standard wireless telephone information. A mechanical hinge 14 extends along the spine of the PCT 10 on the left side, enabling the PCT to be selectively swung from a closed to an open position, and vice versa. The hinge allows the PCT to be opened to a full 180 degrees and laid flat in the opened position if desired. The PCT 10 may be utilized as a normal wireless telephone when in the closed position. A rotatable antenna 15 extends from the PCT case. The front side may also include a microphone 16 and a speaker 17.

Figure 2:
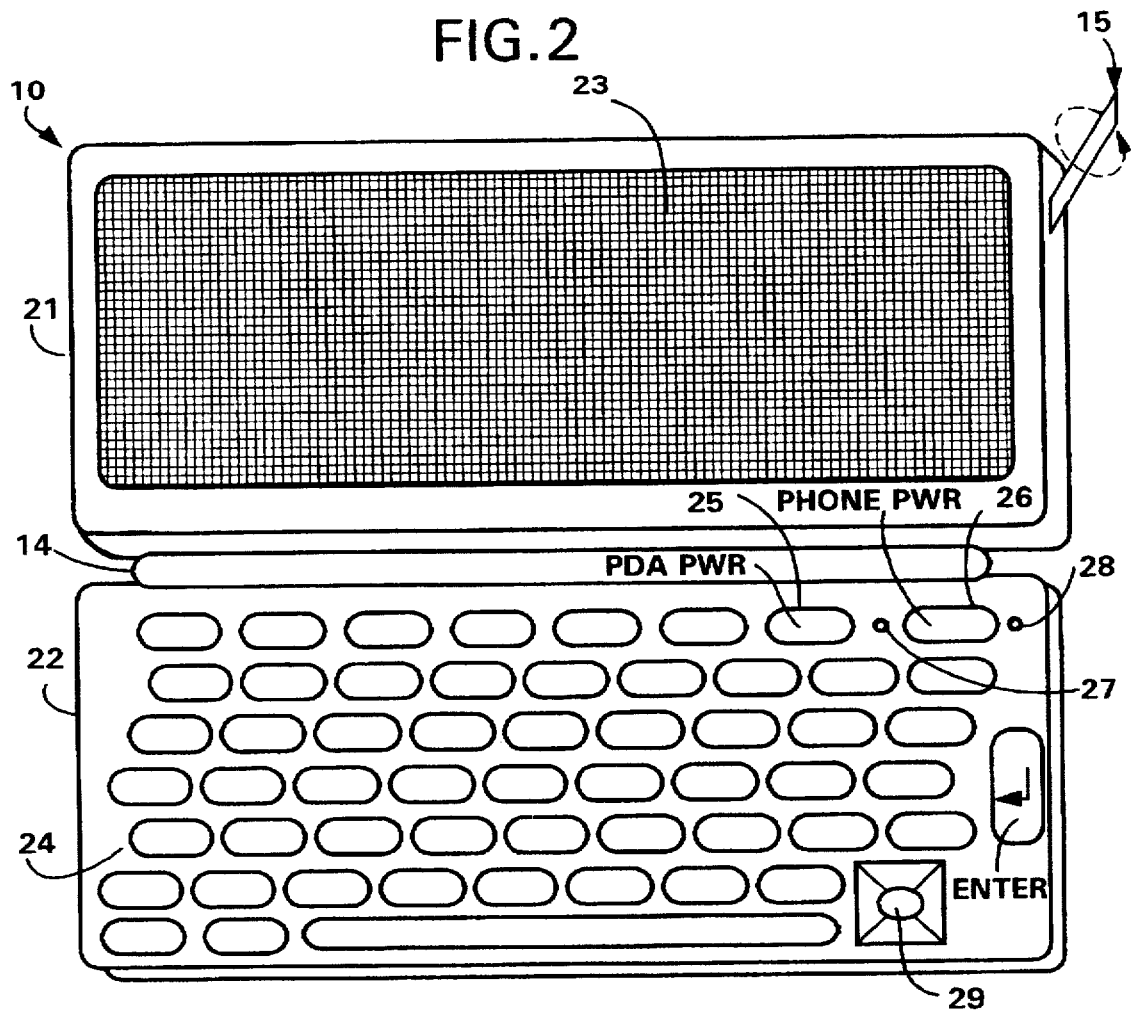
FIG. 2 is a front side elevational view of the PCT of the present invention in an open position and rotated 90 degrees clockwise from the orientation in FIG. 1.

FIG. 2 is a front side elevational view of the PCT of the present invention in an open position and rotated 90 degrees clockwise from the orientation in FIG. 1. This orientation forms a top half 21 and a bottom half 22 of the PCT 10. The mechanical hinge 14 holds the top half 21 and the bottom half 22 together and covers a data and power cable connecting the two halves. A sensor (not shown) detects whether the phone is in an opened or a closed position.

The top half 21 includes a display screen 23 for use with a personal digital assistant (PDA) unit, and the rotatable antenna 15 for use with the mobile telephone unit. As shown in FIG. 2, the antenna 15 may be rotated in such away that its orientation is independent of the orientation of the top half 21 in order to optimize transmission and reception qualities. For example, the orientation of the antenna 15 may be maintained approximately vertical regardless of the orientation of the top half 21 in order to optimize transmission and reception of wireless telephone signals.

The bottom half 22 includes a full alpha-numeric personal computer keyboard 24 for use with the PDA. The keyboard 24 includes a PDA power switch 25 and an interior telephone power switch 26 which are utilized to power on/off the PDA unit and the telephone unit, respectively, when the PCT 10 is being operated in the open position. A PDA power-on light indicator 27 and a telephone power-on light indicator 28 are mounted adjacent to the PDA and telephone power switches 25 and 26, and indicate whether the PDA unit and/or the telephone unit are energized. The indicators can only be seen when the PCT is in the open position. The PCT is OFF when in the closed position unless the telephone unit is individually energized utilizing the external telephone power switch 13 (FIG. 1). The keyboard 24 may also include an optional trackball 29 to move a cursor around the PDA display screen 23.

If the telephone unit is powered ON by using the external telephone power switch 13, the telephone power-indicator light 28 comes ON when the PCT is opened. Power-indicators 27 and 28 are OFF when the PCT is closed.

Figure 3:
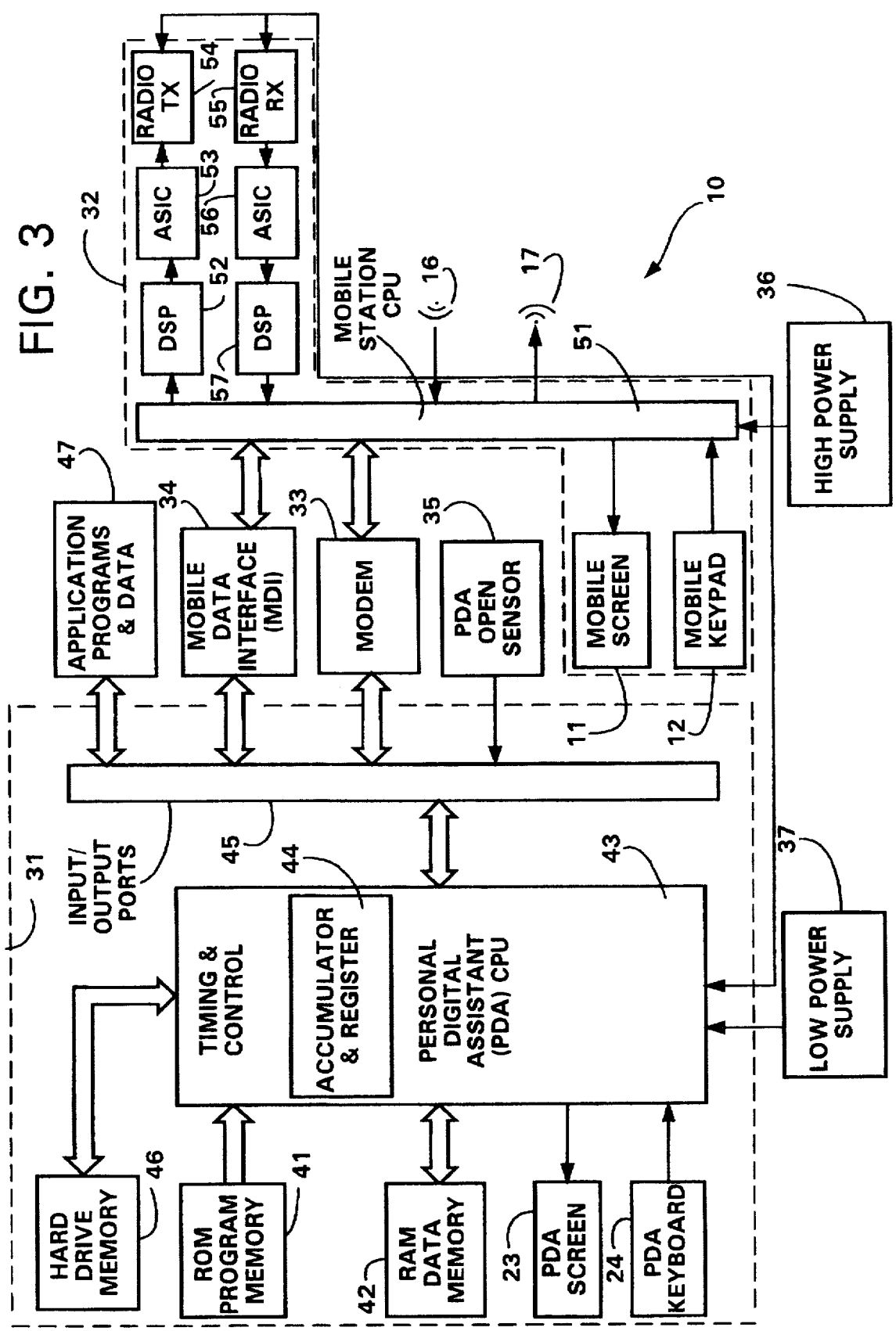
FIG. 3 is a high level block diagram of the components of the PCT in the preferred embodiment of the present invention.

FIG. 3 is a high level block diagram of the components of the PCT in the preferred embodiment of the present invention. Functionally, the PCT 10 is divided into a personal digital assistant (PDA) functional unit 31, telephone functional unit 32, a modem 33, a mobile data-interface (MDI) unit 34, and a PDA Open sensor 35. The MDI unit 34 transfers data directly between the PDA unit 31 and the telephone unit 32 without the use of the modem 33. The MDI may be implemented as a RAM memory device with common access by both the PDA unit 31 and the telephone unit 32. The RAM memory device may be separate from the PDA RAM 42 or may be a reserved portion of the PDA RAM 42. Data transferred through the MDI 34 may include, for example, telephone numbers entered on the PDA keyboard and the state of the PDA Open sensor 35.

A connecting circuit (not shown) electronically connects the PDA unit 31, the telephone unit 32, the modem 33, the MDI unit 34, and the PDA Open sensor 35. Two power supply units (batteries) 36 and 37 supply electrical power to the PCT. The batteries are located in the bottom half 22 of the PCT which includes the PDA keyboard 24. This configuration provides a low center of gravity and stability to the PCT 10. A high power supply 36 provides high power to the wireless telephone unit 32 and the PDA unit 31. A low power supply 37 provides a back-up power source for the PDA unit 31 when the high power supply 36 is detached from the unit for charging or when its energy level is low. Power to the PDA unit 31 is turned OFF when the PCT 10 is in the closed position. Power may still be supplied to the telephone unit 32 in the closed position if the telephone unit is in use.

Other components of the PDA unit 31 include a read only memory (ROM) 41 for storing application programs and providing limited operations of the PDA unit when operating off the low power supply 37. The PDA unit also includes a random access memory (RAM) 42 for storing data, the PDA display screen 23, the PDA keyboard 24, a PDA central processing unit (CPU) 43 which may be a microprocessor for timing and control of the PDA, an accumulator/register 44 contained within the PDA CPU 43, various input/output (I/O) ports 45, and a hard drive memory device 46. The I/O ports 45 send and receive data from, for example, the mobile data interface 34, the modem 33, the PDA Open sensor 35, and external sources of application software programs 47 and data which may be loaded onto the hard drive memory 46. The hard drive memory device 46 stores application software programs and data, and provides the PDA unit with full personal computer capabilities. The hard drive is powered from the high power source 36.

When electrical power from the power supplies exceeds the minimum power level required for operation of the hard drive, the PDA unit 31 may utilize the hard drive to access application software programs stored there. This capability, combined with the PDA's full alpha-numeric keyboard 24 and PDA screen 23, make the PDA a fully functional personal notepad computer. Telephone (PHONE) and facsimile (FAX) functions are also performed and may be indicated with icons shown on the PDA screen 23 or as selections on a pull-down menu. When electrical power from the power supplies is less than the minimum power level required for operation of the hard drive, the PDA unit 31 may utilize the ROM 41 to access the application software programs stored there.

The telephone unit 32 includes a mobile station CPU 51, the mobile telephone display screen 11, the mobile telephone keypad 12, the microphone 16, the speaker 17, and transmit and receive subsystems. The transmit subsystem includes a transmit digital signal processor (DSP) 52, a transmit application specific integrated circuit (ASIC) 53, and a radio transmitter 54. The receive subsystem includes a radio receiver 55, a receive ASIC 56, and a receive DSP 57. The telephone unit 32 is capable of operating on either an analog control channel or a digital control channel. The telephone unit 32 is also multi-hyperband capable, and may operate on the 800-MHz wireless telephone frequency hyperband as well as other hyperbands such as the 1900-MHz personal communication system (PCS) frequency hyperband.

The following functions are performed by the PDA unit 31:

Calculator;

Agenda;

Clock;

Notepad; and

Editors (Text, Graphics, Image).

Making a Call

If the PCT 10 is in the closed position, a telephone call is made in the same manner as calls placed on an ordinary wireless telephone. If the PCT is in the open position, the user may select the PHONE application on the PDA display 23. A LIST function is then displayed, and if selected, presents a list of telephone numbers from which to choose. The user may select a phone number from the list by highlighting the number and pressing the <ENTER> key on the PDA keyboard 23, or by double-clicking the number with the trackball 29. If the telephone unit 32 is not already turned on, it is then turned on, and the selected number is automatically dialed by the PDA unit 31, by transmitting the number through the mobile data interface 34 to the telephone unit. If the telephone number to be called is not on the list of telephone numbers presented, the user may enter the telephone number utilizing the PDA keyboard 24. By then pressing the <ENTER> key, the entered number is automatically dialed by the PDA unit, by transmitting the number through the mobile data interface to the telephone unit. The user may then close the two halves of the PCT 10 and use it as an ordinary wireless telephone.

Sending a Facsimile (FAX)

The PCT 10 must be in the open position to send a Fax. The user may utilize a Text Editor to edit the message, and then may select the FAX application on the PDA display 23. A list of telephone numbers is then displayed, and the user may select a phone number from the list by highlighting the number and pressing the <ENTER> key on the PDA keyboard 24, or by double-clicking the number with the trackball 29. If the telephone unit 32 is not already turned on, it is then turned on, and the selected number is automatically dialed by the PDA unit 31, by transmitting the number through the mobile data interface 34 to the telephone unit. Once the telephone connection is made to the called number, the Fax message is sent through the modem 33 to the telephone unit.

Using the PCT as a Wireless Data Terminal

The PCT 10 may also be utilized as a Wireless Data Terminal (WDT) to send and receive messages such as Short Message Service (SMS) messages. The PCT must be in the open position to use this function. Upon receiving a SMS message, the PCT displays the text of the SMS message on the PDA display screen 23 and provides a SMS warning tone. Upon hearing the SMS warning tone, the user may open the PCT and read the message on the PDA display.

To send a SMS message utilizing the PCT 10, the user may utilize the Text Editor to edit the message, and then selects the SMS application on the PDA display screen 23. A list of telephone numbers is then displayed, and the user may select a phone number from the list by highlighting the number and pressing the <ENTER> key on the PDA keyboard 24, or by double-clicking the number with the trackball 29. If the telephone unit 32 is not already turned on, it is then turned on, and the SMS message is automatically sent through the mobile data interface 34 to the telephone unit.

To use the PCT 10 as a wireless data terminal, the user selects the Data Terminal (DT) application. A list of remote computer telephone numbers is then displayed on the PDA display screen 23. The user enters or selects a desired telephone number from the list. Once the telephone number of a remote computer is selected, it is automatically dialed by the PDA 31, and the data communication is established through the modem 33 to the telephone unit 32. The user may then start a dialogue with the remote computer, utilizing the PCT as a Data Terminal.

Figure 4:
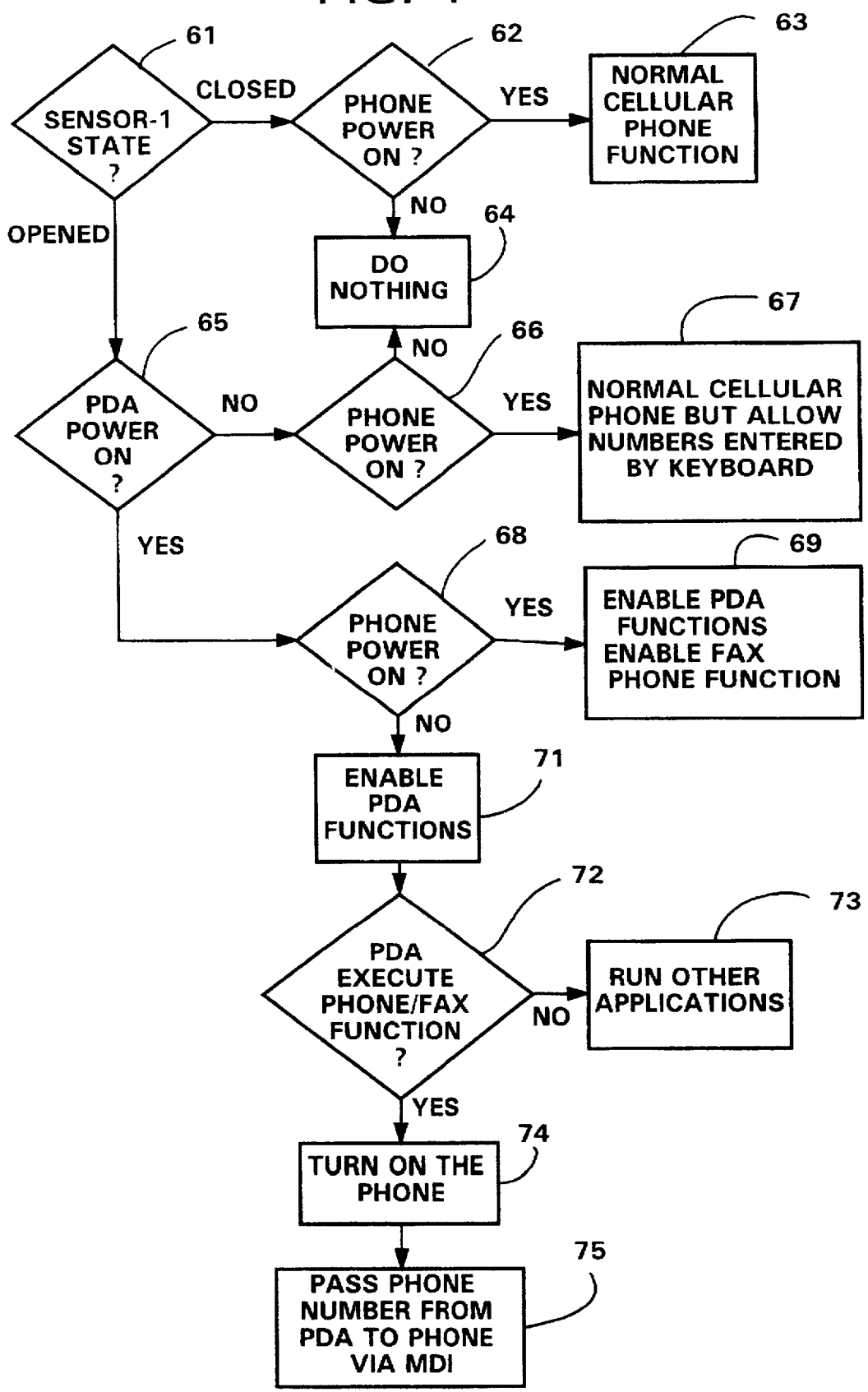
FIG. 4 is a flow chart illustrating the functions performed by the PCT during selection of a mode of operation.

FIG. 4 is a flow chart illustrating the functions performed by the PCT 10 during selection of a mode of operation. The process begins at step 61 where the PCT determines from a reading from the PDA-Open sensor 35 whether the PCT is in the open position or the closed position. If it is determined that the PCT is in the closed position, the process moves to step 62 where it is determined whether or not power is ON to the telephone unit 32. If power to the telephone unit is ON, the process moves to step 63 where normal wireless telephone functions are enabled. If, however, it is determined at step 62 that power is not ON to the telephone unit, then the process moves to step 64 where the process stops and no functions are enabled.

Returning to step 61, if the PDA-Open sensor 35 reported that the PCT was in the open position, then the process moves to step 65 where it is determined whether or not power is ON to the PDA unit 31. If power is not ON to the PDA unit 31, then the process moves to step 66 where it is determined whether or not power is ON to the telephone unit 32. If it is determined at step 66 that power is not ON to the telephone unit, then the process returns to step 64 where the process stops and no functions are enabled. If, however, it is determined at step 66 that power is ON to the telephone unit, then the process moves to step 67 where normal wireless telephone functions are enabled, and the PDA keyboard 24 is enabled for entering telephone numbers.

Returning to step 65, if the power is ON to the PDA unit 31, then the process moves to step 68 where it is determined whether or not power is ON to the telephone unit 32. If it is determined at step 68 that power is ON to the telephone unit, then the process moves to step 69 where PDA functions, normal wireless telephone functions, and FAX functions are enabled. If, however, it is determined at step 68 that power is not ON to the telephone unit, then the process moves to step 71 where PDA functions only are enabled.

The process then moves to step 72 where it is determined whether the user has requested the PDA unit 31 to execute a phone or a FAX function by entering a telephone number or a FAX number on the PDA. If not, the process moves to step 73 and executes other applications. If the user has requested the PDA to execute a phone or a FAX function, the process moves to step 74 where the PDA unit 31 turns on the telephone unit 32. At step 75, the process then passes the telephone or Fax number to the telephone unit 32 through the mobile data interface 34.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A personal communications terminal in a case having a first half hingedly connected to a second half, said personal communications terminal operating in an open and a closed position, said personal communications terminal comprising:

mobile telephone means including:
      a telephone display screen;
      a keypad for entering instructions and data that are displayed on said telephone display screen; and
      a telephone power switch that independently energizes said mobile telephone means;
   personal digital assistant means electronically connected to said mobile telephone means, said personal digital assistant means comprising:
      a first memory device for storing a first set of application software programs;
      a second memory device for storing a first set of data;
      a processor for performing operations with said first set of data utilizing said first set of application software programs; and
      a personal digital assistant power switch that independently energizes said personal digital assistant means;
   a power supply for providing electrical power to said mobile telephone means and said personal digital assistant means;
   a modem for passing data between said personal digital assistant means and said mobile telephone means; and
   a mobile data interface for passing data between said personal digital assistant means and said mobile telephone means without utilizing said modem.

2. The personal communications terminal of claim 1 wherein said first memory device is a read only memory (ROM).

3. The personal communications terminal of claim 2 wherein said second memory device is a random access memory (RAM).

4. The personal communications terminal of claim 1 wherein said personal digital assistant unit includes a third memory device that stores a second set of data and a second set of application software programs.

5. The personal communications terminal of claim 4 wherein said third memory device is a hard drive memory.

6. The personal communications terminal of claim 5 further comprising:

means for determining whether said electrical power from said power supply exceeds a predetermined threshold; and
   means for enabling access to said second set of data and said second set of application software programs stored in said hard drive memory upon determining that said electrical power from said power supply exceeds said predetermined threshold.

7. The personal communications terminal of claim 6 further comprising means for restricting access to said first set of application software programs stored in said first memory device and said first set of data stored in said second memory device upon determining that said electrical power from said power supply is less than said predetermined threshold.

8. The personal communications terminal of claim 7 further comprising an input/output (I/O) port for inputting to said hard drive memory and outputting from said hard drive memory, said second set of application software programs and said second set of data.

9. The personal communications terminal of claim 8 wherein said second set of application software programs includes programs that run on all personal computers.

10. The personal communications terminal of claim 9 wherein said mobile telephone unit includes:

means for operating on an analog control channel; and
    means for operating on a digital control channel.

11. The personal communications terminal of claim 9 wherein said mobile telephone unit includes means for transmitting and receiving on a plurality of frequency hyperbands.

12. The personal communications terminal of claim 11 wherein said means for transmitting and receiving on a plurality of frequency hyperbands includes:

means for transmitting and receiving on a 800-MHz frequency hyperband; and
    means for transmitting and receiving on a 1900-MHz frequency hyperband.

13. A personal communications terminal in a case having a first half hingedly connected to a second half, said personal communications terminal operating in an open and a closed position, said personal communications terminal comprising:

a mobile telephone unit including:
       a telephone display screen;
       a keypad for entering instructions and data that are displayed on said telephone display screen;
       a telephone power switch that energizes said mobile telephone unit; and
       means for transmitting and receiving on a plurality of frequency hyperbands, said transmitting and receiving means including:
          means for transmitting and receiving on a 800-MHz frequency hyperband; and
          means for transmitting and receiving on a 1900-MHz frequency hyperband;
    a personal digital assistant unit electronically connected to said mobile telephone unit, said personal digital assistant unit comprising:

a first memory device for storing a first set of application software programs;

a second memory device for storing a first set of data;

a hard drive memory that stores a second set of data and a second set of application software programs, said second set of application programs including all personal computer software application programs; and a processor for performing operations with said first set of data utilizing said first set of application software programs;

an input/output (I/O) port for inputting to said hard drive memory and outputting from said hard drive memory, said second set of application software programs and said second set of data;

a power supply for providing electrical power to said mobile telephone unit and said personal digital assistant unit;

means for accessing said second set of data and said second set of application software programs stored in said hard drive memory when said electrical power from said power supply exceeds a predetermined threshold;

means for accessing said first set of application software programs stored in said first memory device and said first set of data stored in said second memory device when said electrical power from said power supply is less than said predetermined threshold;

a modem for passing data between said personal digital assistant unit and said mobile telephone unit; and a mobile data interface for passing data between said personal digital assistant unit and said mobile telephone unit without utilizing said modem.

14. The personal communications terminal of claim 13 wherein said telephone display screen is located on an exterior side of said personal communications terminal.

15. The personal communications terminal of claim 14 wherein said keypad is located on said exterior side of said personal communications terminal adjacent said telephone display screen.

16. The personal communications terminal of claim 15 wherein said mobile data interface passes telephone numbers from said personal digital assistant unit to said mobile telephone unit without utilizing said modem.

17. The personal communications terminal of claim 16 wherein said personal communications terminal includes:

means for determining whether a user of said personal digital assistant unit has requested that the personal communications terminal perform a telephone or a facsimile function when power to said mobile telephone unit is off; and means for turning on said mobile telephone unit upon determining that said user has requested that the personal communications terminal perform a telephone or a facsimile function.

18. The personal communications terminal of claim 17 wherein said means for turning on said mobile telephone unit includes means for passing an instruction from said personal digital assistant unit to said mobile telephone unit through said mobile data interface unit, said instruction turning on said mobile telephone unit.

19. The personal communications terminal of claim 18 further comprising a sensor that senses whether said personal communications terminal is in the open or the closed position.

20. The personal communications terminal of claim 19 wherein a first interior face and a second interior face are formed when said PCT is in the open position, said first interior face including a display screen for said personal digital assistant unit.

21. The personal communications terminal of claim 20 wherein said second interior face includes an alpha-numeric keyboard for inputting instructions and data to said personal digital assistant unit.

22. The personal communications terminal of claim 21 wherein said personal digital assistant unit includes a personal digital assistant power switch that energizes said personal digital assistant unit independently from said mobile telephone unit.

* * * * *